May 20, 1952 G. W. FYLER 2,597,092

VERTICAL SWEEP GENERATOR

Filed Sept. 19, 1946

Inventor
George W. Fyler

By Mueller and Mason

Attorneys

Patented May 20, 1952

2,597,092

UNITED STATES PATENT OFFICE 2,597,092

VERTICAL SWEEP GENERATOR

George W. Fyler, Lombard, Ill., assignor to Motorola, Inc., a corporation of Illinois Application September 19, 1946, Serial No. 698,055

6 Claims. (Cl. 250—36)

Figures 1, 2:
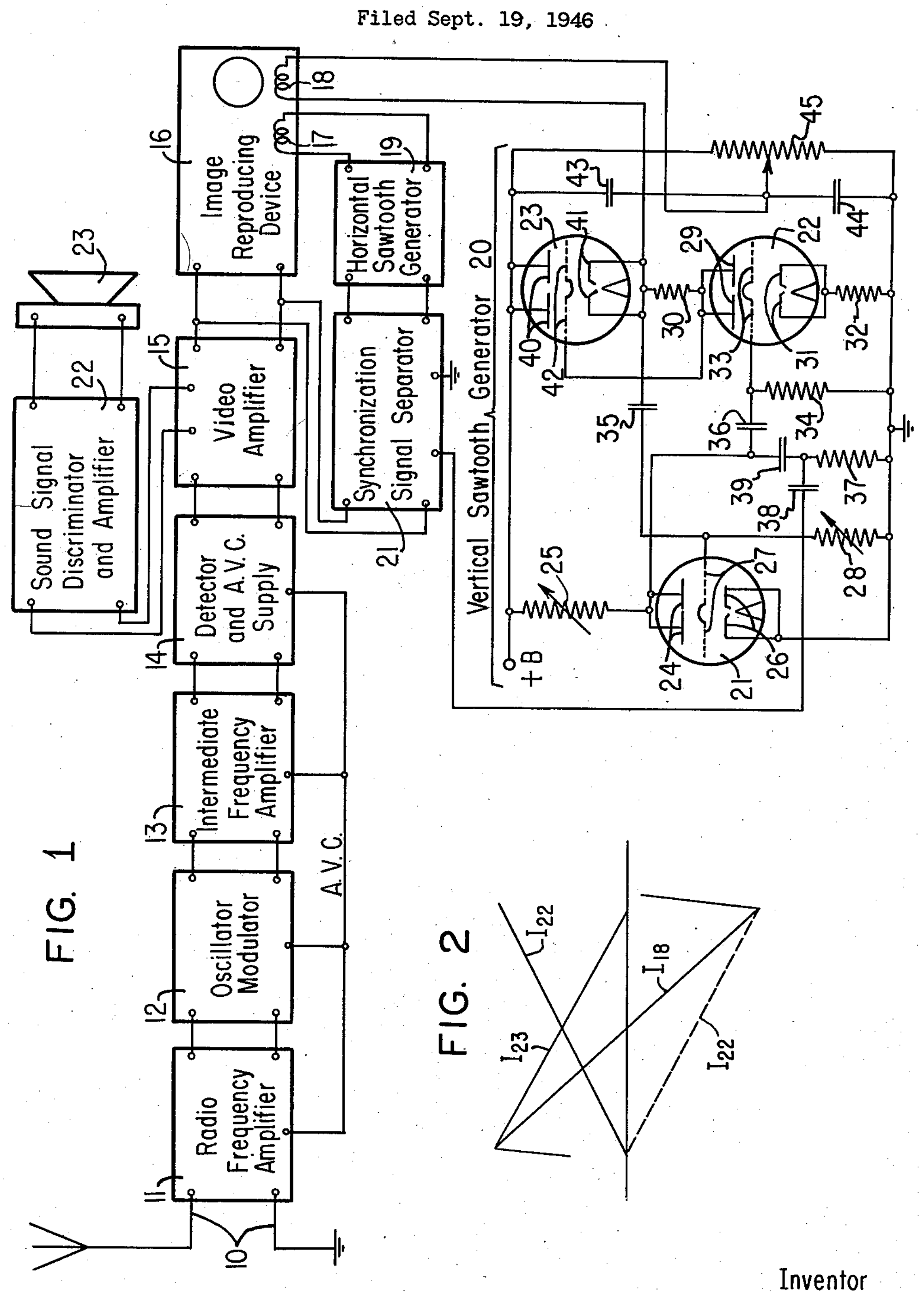

This invention relates generally to apparatus for producing sawtooth currents and in particular to a simple and efficient generator for producing current of sawtooth wave form in an inductive load as required for deflecting the scanning beam in a television system.

It has been the general practice in the design of generators for producing deflecting currents in television systems to use an amplifier coupled to the deflecting coil through a transformer. Such systems are objectionable in that the transformer is a very expensive item, in most cases costing more than all the other components of the current generator. The transformer is expensive especially because of the large inductance required to provide acceptably linear deflecting currents. In many cases a poor impedance match is obtained requiring a large input current as compared to the actual power supplied to the deflecting coil. This makes for both an expensive and inefficient system.

In some systems the transformer has been eliminated and a resistance capacity coupled circuit is used. These circuits inherently are very inefficient. Another difficulty which has been encountered is that sawtooth generators operating at low frequencies as required for vertical scanning are not sufficiently linear to follow the standard scanning pattern without linearity circuits and controls.

It is, therefore, an object of the present invention to provide an improved sawtooth current generator which is of inexpensive construction.

It is another object of this invention to provide a sawtooth current generator which is both stable and efficient in operation, for supplying scanning currents for vertical deflection in a television system.

It is a further object of this invention to provide a sawtooth current generator which can be connected directly to a deflecting coil in a television receiver tube without the use of a transformer for coupling the same.

A feature of this invention is the provision of a sawtooth current generator in which a multivibrator and amplifier are combined into a single unit having an output which can be connected directly to a deflecting coil of a television system.

A further feature of this invention is the provision of an amplifier including a pair of vacuum tubes connected in series with a load connected to the common connection between the tubes so that the effective output impedance of each of the tubes is high and the plate current drawn thereby is low.

A still further feature of this invention is the provision of a hum neutralization circuit for a vertical sawtooth generator for a television receiver to eliminate hum in the receiver caused by the heavy 60 cycle current drawn by the generator and also eliminate hum in the deflecting coils.

Further objects, features and advantages of this invention will be apparent from a consideration of the following description taken in connection with the accompanying drawings in which:

Fig. 1 is a schematic diagram of a television receiver showing the standard components in block diagram and the vertical sawtooth generator in detail; and Fig. 2 is a chart showing the output current and the components thereof.

In practicing my invention I provide a sawtooth current generator for providing 60 cycle current for the vertical deflecting coils of a television receiver. The generator comprises a multi-vibrator combined with an amplifier to provide sawtooth current in the inductive deflecting coils which may be directly connected to the amplifier without the use of a transformer. The multi-vibrator is of generally standard construction utilizing two vacuum tubes and including a peaking resistor to which synchronization pulses may be applied for controlling the operation thereof. An additional vacuum tube is connected in series with the output tube of the multi-vibrator to increase the output thereof. This tube obtains its excitation from the load resistor of the output tube and provides a substantially linearly decreasing current as compared to the linearly rising current of the output tube. The vertical deflecting coil is connected to the common connection between these two tubes so that the output of the tubes are in opposition and the currents combine to provide a sawtooth current in a deflecting coil having an amplitude equal to the difference of the currents through the two tubes. This manner of connection provides an effective high impedance load for the tubes and eliminates the necessity for a coupling transformer. By utilizing tubes having two sections connected in parallel, the impedance on each section is approximately four times the actual impedance of the deflecting coils.

Referring now to the drawings, in Fig. 1 is illustrated a television receiver of the superheterodyne type and the circuit diagram of the vertical sawtooth generator in accordance with the invention. Incoming signals are picked up by an antenna-ground circuit 10 and the signals of the desired frequency are selected and amplified in the tunable radio frequency amplifier 11. The signals are then converted into intermediate frequency form by an oscillator-modulator 12 and are further selected and amplified in an intermediate frequency amplifier 13. The picture and sound signals are then derived by detector 14 and amplified in the video frequency amplifier 15. The picture and sound signals are separated in the output circuit of the video amplifier, the picture signals being applied to the control electrode of the image reproducing device 16. For the purpose of deflecting the image producing beam of the device 16, deflecting coils 17 and 18 are provided in this device which are supplied with current of sawtooth wave form by horizontal and vertical sawtooth generators 19 and 20, respectively. The synchronizing signals are separated and amplified in the synchronization signal separator 21 and are applied to both the horizontal sawtooth generator 19 and the vertical sawtooth generator 20. The sound modulated signals are delivered from the video frequency amplifier 15 to the sound signal discriminator and amplifier unit 22 where they are converted into amplitude modulated signals and then amplified and are reproduced by a sound reproducing device 23. All of the units described with the exception of the vertical sawtooth generator 20 may be of well known construction and accordingly are not illustrated and described in detail. The operation of the sawtooth generator 20 will be described in detail below.

Referring now to the vertical sawtooth generator 20, as illustrated in Fig. 1, the generator comprises a multi-vibrator composed of tubes 21, 22 and 23, the tubes 22 and 23 functioning both as a part of the multi-vibrator and the amplifier. Each of the tubes 21, 22 and 23 are illustrated as having two triode sections connected in parallel, tubes type 6SN7 being found to be very satisfactory for this use. It is obvious, however, that other types of electron discharge valves can be used and that satisfactory operations can be obtained by using a single triode section. The tube 21 includes plates 24 connected to the +B power supply through variable resistor 25, cathodes 26 connected directly to ground, and grids 27 biased by variable resistor 28. The tube 22 includes plates 29 connected to the +B power supply through load resistor 30 and tube 23, cathodes 31 grounded through resistor 32, and grids 33 biased by resistor 34. The two tubes are interconnected by condenser 35 which couples the grids 27 of tube 21 to the common terminal between the load resistor 30 and tube 23, and by condenser 36 which couples the grids 33 of tube 22 to the plates 24 of tube 21. For applying the synchronization pulses to the multi-vibrator a resistor 37 is provided across which synchronization pulses are applied through the coupling condenser 38. This voltage is applied to the grids 33 of tube 22 through condenser 39 and coupling condenser 36 previously described.

The sawtooth current amplifier includes the tubes 22 and 23 connected in series, the connections to tube 22 being previously described. Tube 23 includes plates 40 connected to the +B power supply and cathodes 41 connected to the load resistor 30. The grids 42 of the tube 23 are connected across the load resistor 30 to provide excitation for the tube from the voltage appearing thereon. The vertical deflecting coil 18 is connected to the common terminal between the load resistor 30 of tube 22 and cathode 41 of tube 23 and to a hum neutralization circuit composed of equal capacitors 43 and 44 and centering resistor 45 which are connected between +B and ground.

In the operation of the multi-vibrator circuit the tube 21 is temporarily non-conducting, the condenser 35 holding the grids 27 thereof below cut-off. The condenser 39 is charged from the +B power supply through resistor 25 to provide an increasing grid voltage for tube 22 which causes the current therein to increase at a substantially uniform rate. As the operation proceeds the condenser 35 is discharged through resistor 28 until the grids 27 are of such potential that the tube 21 conducts. However, in operation as a scanning generator, the natural frequency of the multi-vibrator is set so that before the tube 21 naturally becomes conducting, a synchronization pulse is applied across resistor 37. The synchronization pulse is negative and causes the grids 33 to go negative and the plate voltage of tube 22 to rise very suddenly. The rise in voltage of plate 29 produces a corresponding rise in voltage of the grids 27 of tube 21 causing the tube 21 to conduct. The heavy plate current through the tube 21 results in a drop in voltage of the plates 24 thereof and a further drop in the voltage of grids 33. The peaking effect of resistor 37 insures that the tube 22 is cut off. This action is very fast and provides the retrace portion of the cycle. During the retrace the condenser 39 is discharged causing a low voltage on the grids 33. The grids 27 draw current charging the condenser 35 in a direction to cause the grids 27 to become negative thereby cutting off tube 21. This ends the retrace period and the condenser 39 again charges to provide a linearly increasing voltage on the grids 33 so that tube 22 conducts to provide the next trace portion of the cycle. During the trace the condenser 35 discharges through resistor 28 so that tube 21 is ready to conduct when the next synchronization pulse is received.

The amplifier portion of the generator comprises tubes 22 and 23 and coupling elements therefor. The tube 23 obtains excitation from the load resistor 30 of tube 22 and is connected so that the voltage developed across the load resistor due to current through plates 29 causes the grids 42 to become negative with respect to the cathodes 41. Accordingly at the beginning of the trace period, when the current through tube 22 is small, the grids 42 are at substantially zero potential with respect to cathodes 41 and the current through tube 23 is relatively large. As the current in tube 22 increases, the voltage across resistor 30 accordingly increases and the grids 42 become more negative with respect to cathodes 41 causing the current in the tube 23 to decrease. Fig. 2 shows the plate currents $I_{22}$ and $I_{23}$ of the tubes 22 and 23 respectively, during the trace period.

The deflecting coil 18 is connected at the common connection between the tubes 22 and 23 and the currents through the two tubes flow through the coil in opposite directions. It will be assumed that the flow of current from the cathodes 41 of tube 23 through the deflecting coil 18 and capacitor 43 back to the plate 40 of the tube will be the positive direction of current flow. Therefore, the current from tube 22 which flows from the cathode 31 thereof and through the capacitor 44, will flow through the deflecting coil 18 in a negative direction thereby effectively reversing the current from the tube 22. This reversed current is shown in dotted lines in Fig. 2. The current from the two tubes will, therefore, be combined to produce a current through the deflecting coil 18 as indicated as $I_{18}$ in Fig. 2.

Considered with reference to the alternating current developed in the load 18, the two tubes 22 and 23 are effectively connected in parallel. This provides an effective output impedance for the tubes which is high compared to the impedance of the coil 18. When tubes having two sections are used with the sections connected in parallel as shown, the output impedance in each section is thereby further increased. In an actual example, using a deflecting coil having an impedance of 3000 ohms, the effective load impedance on each section of each tube is approximately 12,000 ohms. This permits the direct connection of the tubes to the deflecting coil without the use of an output transformer thereby simplifying the circuit and reducing the cost of the components required therefor. The output arrangement disclosed also results in reduced plate current, a current of 10 milliamperes being required in the example stated above whereas a plate current of approximately 40 milliamperes would normally be required when a transformer is used.

As the sawtooth generator is designed for use as a vertical scanning generator, the frequency of operation in a standard television system is 60 cycles. To prevent hum in a television receiver caused by the vertical sawtooth generator drawing 60 cycle current from the power supply, and to eliminate the effect of hum in the power supply on the deflection coils, the neutralization circuit composed of condensers 43 and 44 is provided. The condensers 43 and 44 form together with the tubes 23 and 22 a bridge with the source of potential connected across both the tubes and the condensers, and the deflecting coils connected to the terminals between the tubes and the condensers. It is apparent that when the ratio of the capacities of the condensers is equal to the ratio of the output resistances of the tubes, the potential produced by hum in the power supply will be the same at both ends of the deflecting coils. As the tubes are identical, the use of equal condensers 43 and 44 will result in neutralization of this hum voltage. The condensers 43 and 44 also are effective to eliminate the effect of the fluctuating current drawn by the tubes 23 and 22 on the power supply. The currents through the tubes are out of phase as shown by Fig. 2 and the condensers completely balance the system and neutralize the flow of 60 cycle current in the input circuit. That is, the hum voltage across the condenser 43 is balanced by the hum voltage across the condenser 44. The high resistance 45 is used to provide a small residual centering current of either polarity.

The variable resistors 25 and 28 are provided for controlling the magnitude of the deflecting currents and the natural frequency of the multivibrator respectively. The resistor 25 controls the flow of current through condenser 36 to thereby control the rate at which the condenser is charged. By making the resistor 25 large the condenser 36 will charge slowly causing the grid voltage to increase slowly and the current in the tube 22 to increase slowly. As the tube 22 will be cut off at a predetermined time by the synchronization pulse, this effectively limits the maximum current in the deflecting coil and therefore controls the picture size as is well known. Likewise resistor 28 controls the rate of discharge of condenser 35 to thereby control the potential on the grid of tube 21. This governs the time required for the grid 27 to discharge sufficiently for the tube 21 to conduct, and therefore it controls the natural period of the multivibrator.

Sawtooth current generators have been constructed in accordance with the invention and satisfactory results have been obtained. In the generators built, the components had the following values:

| | |
|---|---|
| Tube 21 | 6SN7 |
| Tube 22 | 6SN7 |
| Tube 23 | 6SN7 |
| Resistor 25 | 2 megohms (variable) |
| Resistor 28 | .5 megohm |
| Resistor 30 | 1000 ohms |
| Resistor 32 | 1000 ohms |
| Resistor 34 | 2.2 megohms |
| Condenser 35 | .02 microfarad |
| Condenser 36 | .25 microfarad |
| Resistor 37 | 4700 ohms |
| Condenser 38 | .02 microfarad |
| Condenser 39 | .2 microfarad |
| Condenser 43 | 40 micromicrofarads |
| Condenser 44 | 40 micromicrofarads |
| Resistor 45 | 20,000 ohms |

The above values, however, are not critical and are merely examples of values which have been found to be suitable.

It is, therefore, seen that I have provided a combined multi-vibrator and sawtooth current amplifier which will provide sawtooth currents as are required in the vertical deflection coil of a television system. The system disclosed does not use a transformer and therefore the cost of this system is reduced by a large amount. Also, very small input currents are required to thereby relieve the load on the power supply. The system is stable in operation and provides the necessary controls as well as means for synchronizing the generator with the television synchronization pulses.

While I have described but one embodiment of my invention, it is apparent that various changes and modifications can be made therein which are within the intended scope of the invention as defined by the appended claims.

I claim:

1. A generator for producing current of sawtooth wave form including in combination, first and second electron discharge valves of the triode type each having a cathode, a grid and a plate, resistor means, a source of potential having positive and negative terminals, said resistor means being connected to said plate of said first electron discharge valve and to said cathode of said second electron discharge valve, means connecting said cathode of said first electron discharge valve to the negative terminal of said source of potential and said plate of said second electron discharge valve to the positive terminal of said source of potential so that said first and second valves and said resistor are connected in series across said source of potential for direct current flow, an output circuit connected to said cathode of said second electron discharge valve, and means for applying a voltage wave to said grid of said first electron discharge valve so that a sawtooth current wave is produced in the cathode-plate circuit thereof which is applied through said resistor means to said output circuit, said current wave of said first electron discharge valve producing a voltage wave of substantially sawtooth form across said resistor means, means connecting said plate of said first electron discharge valve to said grid of said second electron discharge valve for applying said voltage wave across said resistor thereto so that a sawtooth current wave is produced in the cathode-plate circuit thereof which varies inversely with said sawtooth current wave through said first electron discharge valve and which has substantially the same amplitude, said current wave through said second electron discharge valve being applied to said output circuit in opposite phase with respect to said current wave from said first electron discharge valve so that said current waves are in effect additive to produce a sawtooth current wave in said output circuit having an amplitude substantially equal to twice the amplitude of said sawtooth current wave in each of said valves.

2. A generator for producing current of sawtooth wave form comprising first and second electron discharge valves of the triode type each having a cathode, a grid and a plate, resistor means, a source of potential, said resistor means being connected to said plate of said first electron discharge valve and to said cathode of said second electron discharge valve, means connecting said cathode of said first electron discharge valve and said plate of said second electron discharge valve to said source of potential so that direct current flows from said source of potential through said first and second valves and said resistor means in series, an output circuit connected to said cathode of said second electron discharge valve so that said valves are connected to said output circuit in parallel and the effective output impedance of each tube is substantially two times the impedance of said output circuit, and means for applying a voltage wave of substantially sawtooth form to said grid of said first electron discharge valve so that a sawtooth current wave is produced in the cathode-plate circuit thereof which is applied through said resistor means to said output circuit, said plate of said first electron discharge valve being connected to said grid of said second electron discharge valve, said current through said first electron discharge valve providing a voltage wave of substantially sawtooth form across said resistor means so that said second electron discharge valve produces a sawtooth current wave in the cathode-plate circuit thereof which varies inversely with said sawtooth current wave through said first electron discharge valve and which has substantially the same amplitude, said current wave through said second electron discharge valve being applied to said output circuit in opposite direction to said current applied thereto by said first electron discharge valve so that said currents are in effect additive to produce a sawtooth current wave in said output circuit having an amplitude substantially equal to twice the amplitude of said sawtooth current wave in each of said valves.

3. A generator for producing current of sawtooth wave form comprising, first and second electron discharge valves each having at least a cathode, a grid and a plate, resistor means, a source of potential, said resistor means being connected to said plate of said first electron discharge valve and to said cathode of said second electron discharge valve, means connecting said cathode of said first electron discharge valve and said plate of said second electron discharge valve to said source of potential so that said first and second valves and said resistor are connected in series across said source of potential for direct current flow, a pair of condenser means connected in series across said source of potential, an output circuit connected to said cathode of said second electron discharge valve and to the common connection between said condenser means so that said valves are connected in parallel to said output circuit for alternating current flow, and means for applying a voltage wave of substantially sawtooth form to said grid of said first electron discharge valve so that a sawtooth current wave is produced in the cathode-plate circuit thereof which is applied through said resistor means to said output circuit, means connecting said plate of said first electron discharge valve to said grid of said second electron discharge valve, said current through said first electron discharge valve producing a sawtooth voltage wave across said resistor which causes said second electron discharge valve to produce a sawtooth current wave in the cathode-plate circuit thereof which varies inversely with said current wave through said first electron discharge valve and which has substantially the same amplitude, said current wave through said second discharge valve being applied to said output circuit in the direction opposite to that in which said current is applied thereto by said first electron discharge valve so that said currents are in effect additive to produce a sawtooth current wave in said output circuit having an amplitude substantially equal to twice the amplitude of said sawtooth current waves in said valves, the capacity of said condenser means being balanced with the plate-cathode impedance of said valves so that the effect of hum in said source of potential on the current in said output circuit, and the effect of the fluctuating current drawn by said valves on said source of potential are neutralized.

4. A generator for producing current of sawtooth wave form comprising, first and second electron discharge valves each having at least a cathode, a grid and a plate, a resistor, a source of potential, said resistor being connected to said plate of said first electron discharge valve and to said cathode of said second electron discharge valve, means connecting said cathode of said first electron discharge valve and said plate of said second electron discharge valve to said source of potential so that said first and second valves and said resistor are connected in series across said source of potential for direct current flow, a pair of condensers connected in series across said source of potential, a potentiometer connected across said source of potential and having a tap adjustably positioned thereon connected to the common connection between said condensers, an output circuit connected to said cathode of said second electron discharge valve and to the common connection between said condensers so that said valves are connected in parallel to said output circuit for alternating current flow, and means for applying a voltage wave of substantially sawtooth form to said grid of said first electron discharge valve so that a sawtooth current wave is produced in the cathode-plate circuit thereof which is applied through said resistor to said output circuit, said plate of said first electron discharge valve being connected to said grid of said second electron discharge valve, said current through said first electron discharge valve producing a sawtooth voltage wave across said resistor which causes said second electron discharge valve to produce a sawtooth current wave in the cathode-plate circuit thereof which varies inversely with said current wave through said first electron discharge valve and which has substantially the same amplitude, said current wave through said second electron discharge valve being applied to said output circuit in the direction opposite to that in which said current is applied thereto by said first electron discharge valve so that said currents are in effect additive to produce a sawtooth current wave in said output circuit having an amplitude substantially equal to twice the amplitude of said sawtooth current waves in said valves, the capacity of said condensers being balanced with the plate-cathode impedance of said valves so that the effect of hum in said source of potential on the current in said output circuit, and the effect of the fluctuating current drawn by said valves on said source of potential are neutralized, said potentiometer having an impedance much greater than that of said condensers and providing a relatively small direct current flow through said output circuit.

5. A generator for producing a current wave of sawtooth wave form including in combination, first and second electron discharge valves of the triode type each having a cathode, a grid, and a plate, resistor means, a source of potential, an energizing circuit connecting said cathode-plate circuits of said first and second discharge valves and said resistance means in series across said source of potential and providing direct current flow therethrough, with said resistance means being connected between said plate of said first electron discharge valve and said cathode of said second electron discharge valve, an output circuit connected to said cathode of said second electron discharge valve, a third electron discharge valve having at least a cathode, a grid and a plate, circuit means connecting said cathode of said second electron discharge valve to said grid of said third electron discharge valve for applying a voltage wave thereto for triggering said third electron discharge valve, circuit means connecting said plate of said third electron discharge valve to said grid of said first electron discharge valve including condenser means charged from said source of potential and discharged when said third electron discharge valve is triggered to provide a voltage wave of substantially sawtooth form to said grid of said first electron discharge valve, said first electron discharge valve providing a sawtooth current wave through said resistor means to said output circuit, and means connecting said grid of said second electron discharge valve to said plate of said first electron discharge valve so that the voltage wave across said resistor means produced by said current wave of said first valve is applied to said second electron discharge valve and a sawtooth current wave is produced in said second electron discharge valve which varies inversely with the sawtooth current wave of said first valve, said current through said second electron discharge valve being applied to said output circuit in opposite phase with respect to said current through said first electron discharge valve so that said current waves are in effect additive to produce a sawtooth current wave in said output circuit having an amplitude substantially equal to twice the amplitude of said sawtooth current wave in each of said valves.

6. A generator for producing a current wave of sawtooth wave form including in combination, first and second electron discharge valves of the triode type each having a cathode, a grid and a plate, resistor means, a source of potential, an energizing circuit connecting said cathode-plate circuits of said first and second discharge valves and said resistance means in series across said source of potential and providing direct current flow therethrough, with said resistance means being connected between said plate of said first electron discharge valve and said cathode of said second electron discharge valve, a pair of condenser means connected in series across said source of potential, an output circuit connected to said cathode of said second electron discharge valve and to the common connection between said condenser means, a third electron discharge valve having at least a cathode, a grid and a plate, circuit means connecting said cathode of said second electron discharge valve to said grid of said third electron discharge valve for applying a voltage wave thereto for triggering said third electron discharge valve, circuit means connecting said plate of said third electron discharge valve to said grid of said first electron discharge valve including condenser means charged from said source of potential and discharged when said third electron discharge valve is triggered to provide a voltage wave of substantially sawtooth form to said grid of said first electron discharge valve, said first electron discharge valve providing a sawtooth current wave through said resistor means to said output circuit, and means connecting said plate of said first electron discharge valve to said grid of said second electron discharge valve so that the voltage wave across said resistor means produced by said current wave of said first valve is applied to said second electron discharge valve and a sawtooth current wave is produced therein which varies inversely with the sawtooth current wave of said first valve, said current through said second electron discharge valve being applied to said output circuit in opposite phase with respect to said current from said first electron discharge valve so that said current waves are in effect additive to produce a sawtooth current wave in said output circuit having an amplitude substantially equal to twice the amplitude of said sawtooth current wave in each of said valves, the capacity of said condenser means being balanced with the cathode-plate impedances of said valve so that the effect of hum in said source of potential on the current in said output circuit, and the effect of the fluctuating current drawn by said valves on said source of potential are neutralized.

GEORGE W. FYLER.

REFERENCES CITED

The following references are of record in the file of this patent:

UNITED STATES PATENTS

| Number | Name | Date |
|---|---|---|
| 2,105,902 | Cawein | Jan. 18, 1938 |
| 2,165,770 | Tolson | July 11, 1939 |
| 2,264,781 | Wheeler | Dec. 2, 1941 |
| 2,280,733 | Tolson | Apr. 21, 1942 |
| 2,302,690 | Germeshausen | Nov. 24, 1942 |
| 2,305,919 | Eaton | Dec. 22, 1942 |
| 2,418,425 | Poch | Apr. 1, 1947 |
| 2,425,491 | Schlesinger | Aug. 12, 1947 |